United States Patent [19]

Lee

[11] Patent Number: 5,389,977

[45] Date of Patent: Feb. 14, 1995

[54] GHOST CANCELER HAVING A FUNCTION OF ADAPTIVELY ADJUSTING A SIGNAL LEVEL

[75] Inventor: Myeong-hwan Lee, Suwon, Rep. of Korea

[73] Assignee: Samsung Electronics Co., Ltd., Kyungki-Do, Rep. of Korea

[21] Appl. No.: 175,232

[22] Filed: Dec. 29, 1993

[30] Foreign Application Priority Data

Dec. 29, 1992 [KR] Rep. of Korea ............... 1992-25962

[51] Int. Cl.⁶ ........................................... H04N 5/213
[52] U.S. Cl. ................................................. 348/614
[58] Field of Search ................. 348/614, 611; 358/905, 358/167; H04N 5/213

[56] References Cited

U.S. PATENT DOCUMENTS

| | | | |
|---|---|---|---|
| 4,564,862 | 1/1986 | Cohen | 348/614 |
| 5,065,242 | 11/1991 | Dieterich | 348/614 |
| 5,121,211 | 6/1992 | Koo | 348/614 |
| 5,130,799 | 7/1992 | Iga | 348/614 |
| 5,283,650 | 2/1994 | Koo | 348/614 |

*Primary Examiner*—Victor R. Kostak
*Assistant Examiner*—Sherrie Hsia
*Attorney, Agent, or Firm*—Sughrue, Mion, Zinn, Macpeak & Seas

[57] ABSTRACT

A ghost canceler having an adaptive signal level adjustment function includes an amplifier for amplifying an analog video signal provided to an analog-to-digital converter and a microprocessor for detecting the peak-to-peak value of the input video signal using a level difference between an input ghost cancellation reference signal contained within the analog video signal and a preset ghost cancellation reference signal and for determining an amplification coefficient using the detected peak-to-peak value. The analog-to-digital converter converts the amplified video signal to produce maximum bit resolution, which thereby permits ghost cancellation performance in the ghost canceler to be enhanced and prevent a loss in displayed video quality.

15 Claims, 3 Drawing Sheets

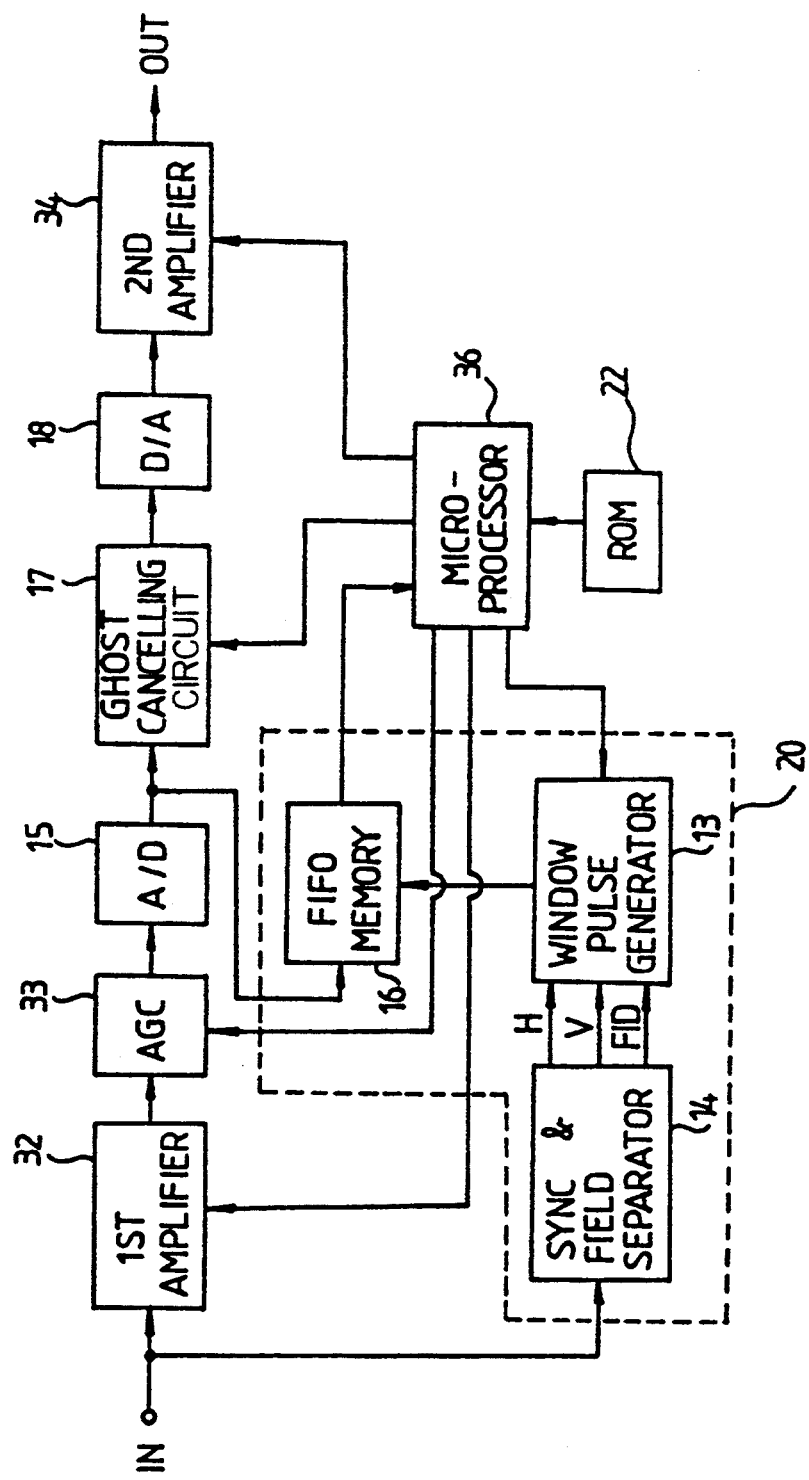

GHOST CANCELER HAVING A FUNCTION OF ADAPTIVELY ADJUSTING A SIGNAL LEVEL

BACKGROUND OF THE INVENTION

1. Field of the Invention

The present invention is related to a ghost canceler and, more specifically, to a ghost canceler cancelling ghost signals which adaptively amplifies a video signal, the signal level of which is varied according to ghost phenomenon generated in the transmission of the video signal.

Korean Patent Application No. 92-25962 is incorporated herein by reference for all purposes.

2. Description of the Prior Art

The ghost phenomenon, that is, the phenomenon of displaying ghost images on a television screen occurs due to the reflectance of the radio frequency waves from the broadcasting station off of mountains or buildings. To cancel such ghost phenomenon, the broadcasting station transmits a ghost cancelling reference (GCR) signal so that the features of the transmission channel can be seen at the receiver. Accordingly, the GCR signal is used in the receiver to determine the features of the ghost in the transmission channel and to cancel the ghost signal from the transmitted video signal. Such technology for cancelling the ghost using the GCR signal has been widely used throughout the world, e.g., in Japan, U.S.A., Korea, etc.

FIG. 1 is a block diagram of the conventional ghost canceler, wherein an analog-to-digital (A/D) converter 15 is connected to an input end IN. The whole system is controlled by a microprocessor 11. A ROM 22, which stores a GCR signal, is connected to one input of microprocessor 11. A ghost cancelling circuit 17 comprises a plurality of finite impulse response (FIR) filters and infinite impulse response (IIR) filters, and performs signal processing on the output data from A/D converter 15 according to a control signal from microprocessor 11. The data output end of ghost cancelling circuit 17 is connected to a digital-to-analog (D/A) converter 18. A GCR detector 20 is connected to input end IN, the output of A/D converter 15 and another input of microprocessor 11, and detects the received GCR signal according to another control signal of microprocessor 11.

GCR signal detector 20 comprises a sync and field separator 14 which is connected to signal input end IN for detecting a horizontal sync signal H, a vertical sync signal and a field identifier FID, a first-in-first-out (FIFO) memory 16 which stores a GCR signal among the output data of A/D converter 15 and supplies the stored GCR signal to microprocessor 11, and a window pulse generator 13 for receiving the output signals H, V and FID of sync and field separator 14 and the control signal of microprocessor 11 and generating a window signal for detecting the GCR signal from the received video signal.

FIGS. 2A through 2C show waveform diagrams of the video signal of which the signal level is varied according to the ghost. FIG. 2A shows an original signal without any ghost, FIG. 2B shows a ghost signal having a predetermined delay time $T_d$ and a predetermined amplitude AM with respect to the original signal, and FIG. 2C shows a video signal including a ghost signal. Since the generally received video signal includes the ghost, the conventional ghost canceler for cancelling the ghost of −6 dB has a bit resolution capable of processing a signal of which the amplitude becomes larger by one-half with respect to the video signal without the ghost. In this manner, A/D converter 15 is designed to have the bit resolution which represents the number of bits which are assigned to the actual data.

Microprocessor 11 reads line information having the GCR signal from ROM 22 and generates the read line information for window pulse generator 13. If the video signal including the ghost is input to the ghost canceler through input end IN, sync and field separator 14 detects horizontal sync H, vertical sync V and field identifier FID from the input video signal and supplies the detected signal H, V and FID to window pulse generator 13. The detected field identifier FID is for discriminating an odd field and an even field. A/D converter 15 converts the input video signal into digital video data and supplies the digital video data to FIFO memory 16 and ghost cancelling circuit 17. Window pulse generator 13 receives output signals H, V and FID of sync and field separator 14 and the GCR line information of microprocessor 11 and generates a window pulse. The FIFO memory 16 stores the GCR signal which is included in the video signal according to the window pulse. When the GCR signal is stored in FIFO memory 16 according to the window pulse, microprocessor 11 reads the GCR signal from FIFO memory 16 and compares the read GCR signal with preset GCR signal provided from ROM 22, to produce a filter coefficient.

Ghost cancelling circuit 17 cancels the ghost from the video signal using the filter coefficient and a number of incorporated impulse response filters. A digital-to-analog (D/A) converter 18 converts the ghost-cancelled video data into an analog signal and outputs the converted analog signal.

As described above, the conventional ghost canceler digitizes the video signal including the ghost without performing amplification control to cancel the ghost. Accordingly, the degree of information loss is varied due to analog-to-digital conversion according to the magnitude of the ghost signal which is input to the A/D converter. As a result, not only is the performance of the ghost canceler is degraded, but also the quality of the displayed image picture is lowered.

SUMMARY OF THE INVENTION

The principal purpose of the present invention is to provide a ghost canceler which alleviates the above identified problems.

An object of the present invention is to provide a ghost canceler in which an input video signal is adaptively amplified and A/D converted prior to ghost cancellation so that the video signal amplitude, which is varied according to the magnitude of a ghost signal, becomes the maximum amplitude which is acceptable in an A/D converter. According to one aspect to the present invention, the ghost-canceled video signal is restored to its original signal level for output from the ghost canceler circuitry.

Another object of the present invention is to provide a ghost canceler in which an input video signal is adaptively amplified and A/D converted to cancel a ghost so that the performance of the ghost canceler is enhanced and so that the displayed picture quality is not degraded.

These and other objects, features and advantages of the invention are provided by a ghost canceler for cancelling a ghost from a received video signal using a ghost cancellation reference (GCR) signal. The ghost canceler includes:
  means for detecting the GCR signal from the received video signal;
  a first amplifier for amplifying the received video signal according to a predetermined amplification coefficient and generating an amplified video signal;
  an analog-to-digital (A/D) converter for A/D converting the output signal of the first amplifier;
  a ghost cancelling circuit for cancelling the ghost from the A/D converted video signal;
  a memory storing preset GCR signal-related information therein; and
  a microprocessor which controls the detection means and ghost cancelling circuit to detect and cancel the ghost, and compares the GCR signal produced by the detection means with a corresponding preset GCR signal level stored in the memory, to determine the amplification coefficient which is supplied to the first amplifier.

These and other objects, features and advantages of the invention are disclosed in or apparent from the following description of preferred embodiments.

BRIEF DESCRIPTION OF THE DRAWINGS

The preferred embodiments are described with reference to the drawings in which like elements are denoted by like or similar numbers and in which:

FIG. 3 is a high level block diagram of a ghost canceler according to one embodiment of the present invention.

DETAILED DESCRIPTION OF THE PREFERRED EMBODIMENT

Figure 1:
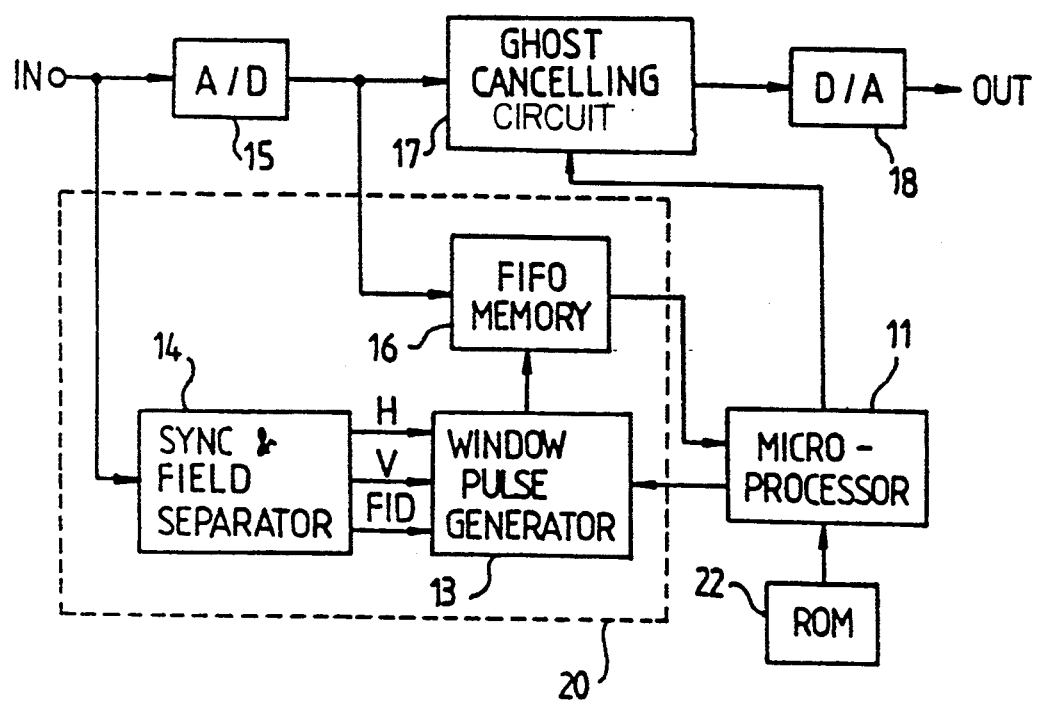
FIG. 1 is a block diagram of the conventional ghost canceler circuit.
Figure 2A:
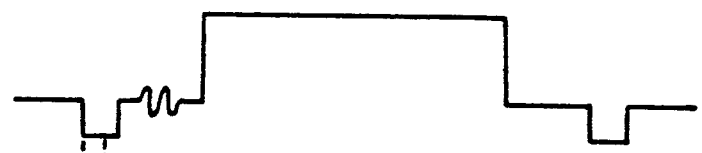
FIGS. 2A through 2C are waveform diagrams of a video signal in which the signal level is varied due to a ghost.
Figure 2B:
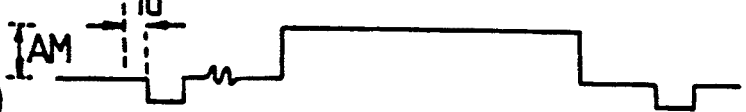
Figure 2C:
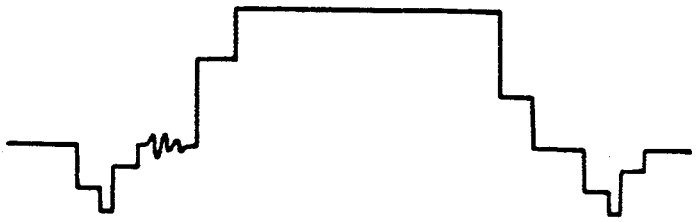

A preferred embodiment of the present invention will be described below in more detail with reference to the accompanying drawings. FIG. 3 is a block diagram of a ghost canceler having a function for adaptively adjusting a signal level according to one embodiment of the present invention. In FIG. 3, the blocks having the same reference numerals as those in FIG. 1 have the same functions as those of FIG. 1.

A first amplifier 32 is connected to an input end IN. An automatic gain controller (AGC) 33 is located between a first amplifier 32 and A/D converter 15. A second amplifier 34 is connected to a signal output end of D/A converter 18. The amplifiers 32 and 34 are connected to microprocessor 36 so as to receive amplification control signals, respectively. Microprocessor 36 further controls amplifiers 32 and 34 by sensing the amplitude variation of the A/D converted GCR signal.

Figure 4A:
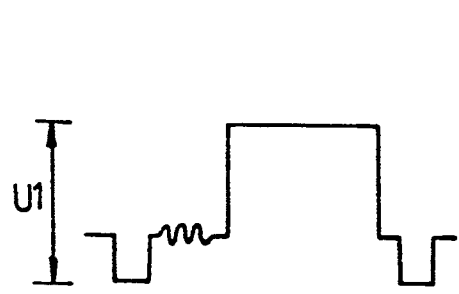
FIGS. 4A and 4B are waveforms which are useful in illustrating the concept of level adjustment of a video signal in the ghost canceler according to the present invention.
Figure 4B:
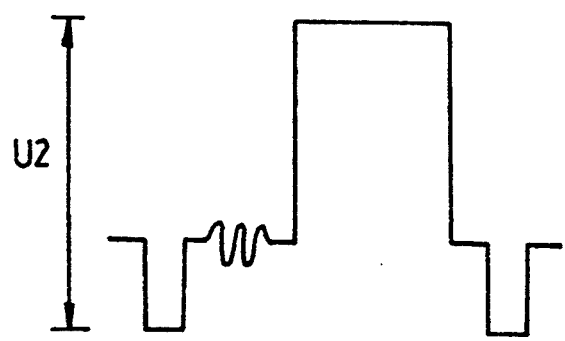

FIGS. 4A and 4B represent concepts of the level adjustment of a video signal in the ghost canceler according to the present invention. FIG. 4A represents a video signal having no ghost supposing the maximum ghost of $-6$ dB, and a use range $U_1$ of A/D converter 15. FIG. 4B represents the maximum use range $U_2$ of A/D converter 15.

When a capability of converting the video signal of FIG. 4B into digital data is given to A/D converter 15, it is not efficient to receive the video signal having no ghost, as shown in FIG. 4A, and to process the received video signal. Thus, in the ghost canceler according to the present invention, the video signal is amplified so that the maximum use range of A/D converter 15 is employed.

When the video signal having a ghost or the video signal without the features of the ghost is input through input end IN, first amplifier 32 does not amplify the input signal and outputs the input signal as it is. Window pulse generator 13 receives sync signals H and V and field identifier FID generated by sync and field separator 14, and GCR line information from microprocessor 36, and thereby detects a GCR signal among the output data of A/D converter 15. The detected GCR signal is stored in FIFO memory 16.

Microprocessor 36 reads the GCR signal stored in FIFO memory 16 and compares the read GCR signal with the preset GCR signal stored in ROM 22, to calculate the ghost characteristics of the transmission channel. At the same time, microprocessor 36 compares the GCR signal read from FIFO memory 16 with the preset GCR signal stored in ROM 22, to detect the amplitude variation of the GCR signal. Also, microprocessor 36 supplies an amplification coefficient produced by the amplitude of the detected GCR signal to first amplifier 32. First amplifier 32 amplifies the video signal following the GCR signal according to the amplification coefficient corresponding to a control signal provided by microprocessor 36 and outputs the amplified signal. That is to say, a peak-to-peak value of the input video signal is amplified and output so that the maximum use range of FIG. 4B can be approached. By this procedure, the video signal input to A/D converter 15 is quantized as a digital signal which is represented as the maximum bit resolution which A/D converter 15 possesses.

AGC 33 gain-controls the output signal of first amplifier 32 so as to prevent the output signal of first amplifier 32 from exceeding the maximum range of A/D converter 15 due to the wrongly calculated amplification coefficient when a severe ghost or impulse noise is present.

The amplified video signal from AGC 33 passes through A/D converter 15 and ghost cancelling circuit 17, so as to be digitized and cancel the ghost. Then, the ghost-cancelled signal is converted into an analog signal by D/A converter 18.

Second amplifier 34 receives the output signal of D/A converter 18 and amplifies the received signal by a control signal of microprocessor 36, e.g., another amplification coefficient corresponding to an inverse number of the amplification coefficient of first amplifier 32. In the above amplification coefficient control technique, the currently detected GCR signal is used for determining an amplification coefficient, which is employed in amplifying the video signal before the following GCR signal for amplification coefficient control is detected.

It is possible to have a variation such that the function of second amplifier 34 of FIG. 3 can be performed in ghost cancelling circuit 17. In this variation, second amplifier 34 can be removed by the manipulation of the coefficients output from microprocessor 36 to ghost cancelling circuit 17. That is, if the amplification coefficient of first amplifier 32 is two, the gain of the filter coefficient in ghost cancelling circuit 17 can be output reduced by one-half, thereby eradicating second amplifier 34.

As described above, the ghost canceler having an adaptive signal level adjustment function according to the present invention includes an amplifier for amplifying an analog video signal input to the ghost canceler circuit and detects a peak-to-peak value of the input video signal using a level difference between the received GCR signal and the preset GCR signal. Preferably, using the detected peak-to-peak value, the video signal advantageously can be amplification-controlled so that the video signal is analog-to-digital converter with the maximum bit resolution which the A/D converter possesses, to thereby enhance accuracy of the digital conversion of the analog signal. Thus, the ghost cancellation performance in the ghost canceler is enhanced and the loss of displayed video quality can be prevented.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A ghost canceler for cancelling a ghost using a ghost cancellation reference signal, said ghost canceler comprising:

detection means for detecting the ghost cancellation reference signal from a received video signal;

a first amplifier for amplifying the received video signal according to a predetermined amplification coefficient to produce an amplified video signal;

an analog-to-digital converter for analog-to-digital converting the output signal of said first amplifier;

a ghost canceling circuit for cancelling said ghost from an analog-to-digital converted video signal to thereby generate a de-ghosted video signal;

a memory storing preset ghost cancellation signal-related information therein; and a microprocessor which controls said detection means and said ghost canceling circuit to detect and cancel the ghost, and which compares a ghost cancellation reference signal level output from said detection means with a corresponding ghost cancellation reference signal level stored in said memory to determine said amplification coefficient supplied to said first amplifier.

2. The ghost canceler according to claim 1, wherein said microprocessor controls the received video signal so that the received video signal excluding the ghost cancellation reference signal to be used for determining said amplification coefficient is amplified according to said amplification coefficient.

3. The ghost canceler according to claim 2, wherein said microprocessor generates said amplification coefficient applied to said first amplifier in generating said amplified video signal to thereby permit analog-to-digital converting of said amplified video signal according to maximum bit resolution of said analog-to-digital converter.

4. The ghost canceler according to claim 3, wherein said ghost canceler further comprises a second amplifier for amplifying the deghosted video signal by a second amplification coefficient which is an inverse number of said amplification coefficient supplied to said first amplifier.

5. The ghost canceler according to claim 1, further comprising an automatic gain controller for gain-controlling said amplified video signal amplified under control of said microprocessor and for supplying a gain-controlled signal to said analog-to-digital converter.

6. The ghost canceler according to claim 5, wherein said automatic gain controller prevents said amplified video signal from having a level exceeding a maximum bit resolution of said analog-to-digital converter from being input to said analog-to-digital converter.

7. A ghost canceler for cancelling a ghost using a ghost cancellation reference signal, said ghost canceler comprising:

a buffer for providing said ghost cancellation reference signal from a received video signal as a received reference signal;

a first amplifier for amplifying said received video signal according to an amplification coefficient;

an analog-to-digital converter connected to said first amplifier for generating a digital output signal;

a ghost canceling circuit for cancelling said ghost from said digital output signal to thereby produce a deghosted signal;

a memory storing preset ghost cancellation signal-related information as a stored reference signal; and a microprocessor which controls said buffer and said ghost canceling circuit to detect and cancel the ghost by comparing a first level of said received reference signal with a second level of said stored reference signal so as to calculate said amplification coefficient supplied to said first amplifier.

8. The ghost canceler according to claim 7, wherein said microprocessor controls said first amplifier so that said received video signal, excluding said received reference signal used in calculating said amplification coefficient, is amplified according to said amplification coefficient.

9. The ghost canceler according to claim 8, wherein said microprocessor generates said amplification coefficient corresponding to maximum bit resolution of said analog-to-digital converter.

10. The ghost canceler according to claim 9, wherein said ghost canceler further comprises a second amplifier for amplifying the deghosted signal by an amplification coefficient which is an inverse of the amplification coefficient supplied to said first amplifier.

11. The ghost canceler according to claim 7, further comprising an automatic gain controller disposed between said first amplifier and said analog-to-digital converter for gain-controlling analog signal level supplied to said analog-to-digital converter under control of said microprocessor.

12. The ghost canceler according to claim 11, wherein said automatic gain controller prevents said analog signal level from exceeding maximum bit resolution of said analog-to-digital converter.

13. A method for operating a ghost canceler cancelling a ghost using a ghost cancellation reference signal, wherein said ghost canceler includes means for detecting the ghost cancellation reference signal in a received video signal as a received reference signal, an analog-to-digital converter receiving an input video signal corresponding to said received video signal and generating a digital video signal, a ghost canceling circuit cancelling the ghost from said digital video signal, a memory storing preset ghost cancellation signal-related information as a stored reference signal and a microprocessor for controlling said detection means and ghost canceling circuit to detect and cancel the ghost, said method comprising the steps of:

(a) calculating an amplification coefficient corresponding to maximum bit resolution of said analog-to-digital converter based on a comparison between a first level of said received reference signal and a second level of said stored reference signal; and (b) amplifying said received video signal according to said amplification coefficient to produce said input video signal.

14. The method according to claim 13, further comprising the step of:

(c) gain-controlling said input video signal.

15. The method according to claim 13, wherein said step (b) comprises the steps of:

(c) amplifying said received video signal according to said amplification coefficient to produce an amplified video signal; and (d) gain-controlling said amplified video signal to produce said input video signal.

* * * * *